(12) United States Patent
Young et al.

(10) Patent No.: US 8,261,003 B2
(45) Date of Patent: Sep. 4, 2012

(54) APPARATUS AND METHODS FOR MANAGING EXPANDED CAPACITY OF VIRTUAL VOLUMES IN A STORAGE SYSTEM

(75) Inventors: Howard Young, Thousand Oaks, CA (US); Mukul Kotwani, Woodland Hills, CA (US); Srinivasa Nagaraja Rao, Oak Park, CA (US); Kartik D. Agarwal, Newbury Park, CA (US); Gordon L. Larimer, Agoura Hills, CA (US)

(73) Assignee: LSI Corporation, Milpitas, CA (US)

( * ) Notice: Subject to any disclaimer, the term of this patent is extended or adjusted under 35 U.S.C. 154(b) by 194 days.

(21) Appl. No.: 12/854,765

(22) Filed: Aug. 11, 2010

(65) Prior Publication Data

US 2012/0042114 A1    Feb. 16, 2012

(51) Int. Cl.
 *G06F 12/08* (2006.01)
(52) U.S. Cl. ............. 711/4; 710/22; 711/203; 711/206; 711/208
(58) Field of Classification Search .................... 710/22; 711/4, 203, 206, 208
See application file for complete search history.

(56) References Cited

U.S. PATENT DOCUMENTS

| | | | |
|---|---|---|---|
| 5,148,538 A | | 9/1992 | Celtruda et al. |
| 5,546,550 A * | | 8/1996 | Carter .......................... 710/313 |
| 5,586,289 A | | 12/1996 | Chin et al. |
| 5,611,064 A * | | 3/1997 | Maund et al. ................. 711/209 |
| 5,946,716 A * | | 8/1999 | Karp et al. .................... 711/207 |
| 6,226,710 B1 * | | 5/2001 | Melchior ....................... 711/108 |
| 6,763,375 B1 | | 7/2004 | Basso et al. |
| 7,191,304 B1 | | 3/2007 | Cameron et al. |
| 7,330,961 B2 | | 2/2008 | Sakata et al. |
| 7,610,464 B2 | | 10/2009 | Otsuka |
| 2002/0133685 A1 * | | 9/2002 | Kalyanasundharam ...... 711/207 |
| 2003/0225993 A1 | | 12/2003 | Yagisawa et al. |
| 2005/0172067 A1 | | 8/2005 | Sinclair |
| 2005/0235132 A1 * | | 10/2005 | Karr et al. ..................... 711/203 |
| 2006/0123112 A1 * | | 6/2006 | Spry ............................. 709/226 |
| 2007/0113044 A1 | | 5/2007 | Day et al. |
| 2007/0208885 A1 | | 9/2007 | Otsuka |
| 2007/0214325 A1 | | 9/2007 | Sasamoto |
| 2008/0282047 A1 | | 11/2008 | Arakawa et al. |
| 2010/0211752 A1 | | 8/2010 | Otsuka |
| 2010/0228650 A1 | | 9/2010 | Shacham et al. |
| 2011/0138390 A1 | | 6/2011 | Takeuchi |
| 2011/0258404 A1 | | 10/2011 | Arakawa et al. |

* cited by examiner

*Primary Examiner* — Jae Yu
(74) *Attorney, Agent, or Firm* — Duft Bornsen & Fishman LLP (57) ABSTRACT

Methods and apparatus for expanded capacity virtual volumes in a virtualized storage system. A storage controller of the storage system parses a SCSI command block as it is received to generate a tag value indicating a segment of a virtual volume to which the command block is directed. The tag value is used to select one of a plurality of mapping segment objects stored in a memory of the controller. Each mapping segment objects maps logical block addresses of a corresponding segment of a corresponding virtual volume to physical storage addresses on the physical storage devices that comprise the virtual volume. An I/O processing circuit of the controller then processes the SCSI command block in accordance with the mapping information in the selected mapping segment object. In one exemplary embodiment, each segment of a virtual volume comprises 2 terabytes of storage capacity of the virtual volume.

14 Claims, 6 Drawing Sheets

APPARATUS AND METHODS FOR MANAGING EXPANDED CAPACITY OF VIRTUAL VOLUMES IN A STORAGE SYSTEM

BACKGROUND

1. Field of the Invention

The invention relates generally to virtualized storage systems and more specifically relates to apparatus and methods within a controller of a virtualized storage system to manage expanded capacity of a virtual volume.

2. Related Patents

This patent is related to commonly owned U.S. patent application Ser. No. 12/854,800 entitled APPARATUS AND METHODS FOR LOOK-AHEAD VIRTUAL VOLUME META-DATA PROCESSING IN A STORAGE CONTROLLER and is related to commonly owned U.S. patent application Ser. No. 12/845,720 entitled APPARATUS AND METHODS FOR REAL-TIME ROUTING OF RECEIVED COMMANDS IN A SPLIT-PATH ARCHITECTURE STORAGE, both of which are hereby incorporated by reference.

3. Discussion of Related Art

A virtualized storage system is one that hides the physical storage devices and functions of the storage system from attached host systems (e.g., from "initiators"). Virtual volumes (also referred to as "logical volumes") are defined and managed by a controller associated with the virtualized storage system. The physical devices associated with such virtual volumes are generally completely hidden from attached hosts. The virtual capacity of a virtual volume may be dynamically altered and provisioning of physical storage to provide the virtual capacity may be reconfigured at any time by the controller associated with the virtualized storage system.

Earlier specifications for storage systems incorporated an inherent 2 terabyte limit on the capacity of a virtual volume. Primarily this limitation arose from the limitations of SCSI command block structures that were previously limited to 10 bytes including a 32 bit logical block address (LBA) field. This command structure is sometimes referred to as Read(10)/Write(10). Therefore, a single SCSI LUN using 512 byte block size (typical) cannot span more than 2 terabytes of capacity. File systems that have been used on these systems have been "adjusted" to handle extremely large volumes. However, volumes that are nearing the 2 terabyte limit may be stressing the limits of the file system. SCSI standards are evolving to include command structures with 16 bytes including a corresponding larger LBA field. These command structures are sometimes referred to as Read(16)/Write(16). Virtual volumes using these larger command structures (with larger LBA fields) could now be specified with much larger capacities.

The controller associated with such virtualized storage systems includes features to map logical addresses supplied in received SCSI command blocks into corresponding physical storage locations (mapping a logical address to one or more physical target storage devices and corresponding physical block addresses on the one or more physical target storage devices). Some existing storage controller designs have mapping structures and methods that presume the earlier 2 terabyte limit for the size of the virtual volume. For example, some older storage controllers may have been designed to process only Read(10)/Write(10) SCSI commands. Such controllers are faced with a problem to alter their designs to support larger virtual volume capacities based on, for example, Read(16)/Write(16) SCSI command structures. In some controllers, the problem may be addressed by logically combining multiple 2 terabyte volumes to provide a virtual volume exceeding the 2 terabyte limits. Each 2 terabyte volume is managed separately within the older controller and a higher layer of logic (i.e., controller software) maintains a corresponding mapping structure for each of the 2 terabyte volumes. Managing each of multiple mapping structures for each of multiple 2 terabyte volumes adds overhead processing to the storage controller and thus reduces storage system performance. More generally, as the capacity of virtual volumes increases, the size and complexity of corresponding mapping structures increases and the overhead processing (i.e., latency) in managing these large volume mapping structures increases accordingly.

Thus, it is an ongoing challenge to improve (i.e., reduce) the overhead processing associated with virtual to physical mapping for virtual volumes having ever larger capacities beyond the older 2 terabyte limits.

SUMMARY

The present invention solves the above and other problems, thereby advancing the state of the useful arts, by providing apparatus and methods for rapid processing of I/O requests directed to large capacity virtual volumes of the storage system. Where logical to physical mapping information is used for large virtual volumes (e.g., larger then 2 terabytes total capacity), the mapping information is divided into mapping segment objects stored in a memory of the storage controller of the system. Each object provides mapping information for its corresponding segment of the total virtual volume capacity. A fast-path I/O processor of the storage controller may include circuits to parse a received I/O request as the request is received and to select a mapping segment object for the segment of the virtual volume to which the request is directed. An I/O processing circuit of the fast-path I/O processor may then access the identified mapping segment object to process the received I/O request without imposing additional overhead latency on processing of the I/O request as compared to prior techniques.

In one aspect hereof, an apparatus is provided within a storage controller of a virtualized storage system for logical to physical mapping of virtual volumes. The apparatus comprises a memory is adapted to store one or more mapping segment objects. Each mapping segment object is adapted to map logical block addresses of a corresponding virtual volume to corresponding physical storage locations. The apparatus also includes a content parsing circuit having an input signal path coupled with an attached initiator and having an output signal path. The content parsing circuit is adapted to parse a SCSI command block as the SCSI command block is received from the initiator. The content parsing circuit generates a tag value applied to its output signal path. The tag value is generated based on information in the received SCSI command block. The apparatus also includes a mapping segment selection circuit having an input signal path coupled with the output signal path of the content parsing circuit to receive a tag value and having an output signal path. The mapping segment selection circuit is adapted to select a mapping segment object in the memory based on a received tag value. The mapping segment selection circuit is further adapted to apply a signal to its output signal path indicating the selected mapping segment object. The apparatus further includes an I/O processing circuit coupled with the memory and having an input signal path coupled with the mapping segment selection circuit. The I/O processing circuit is adapted to access the selected mapping segment object in the memory and adapted to process a received SCSI command block by accessing physical storage locations determined in accordance the selected mapping segment object.

Another aspect hereof provides a method operable in a storage controller of a virtualized storage system. The virtualized storage system is adapted to manage one or more virtual volumes, each virtual volume defined within the storage system to comprise physical storage locations of each of one or more physical storage devices coupled with the storage system. The storage controller is adapted to process a SCSI command block to access an identified virtual volume. The method comprises providing one or more mapping segment objects stored in a memory within the storage controller. Each mapping segment object is adapted to map logical block addresses of a corresponding virtual volume to corresponding physical storage locations. The method also includes receiving, in a parsing circuit within the storage controller, a SCSI command block identifying a virtual volume and identifying a segment of the virtual volume to be accessed by the SCSI command block. The method also generates, in the parsing circuit, a tag value based on information in the received SCSI command block and applies the tag value from the parsing circuit to a mapping segment selection circuit within the storage controller. The method also selects, in the mapping segment selection circuit, a mapping segment object in the memory based on the applied tag value and applies a signal from the mapping segment selection circuit to an I/O processing circuit in the storage controller indicating the selected mapping segment object. The method then processes the received SCSI command block in the I/O processing circuit by accessing physical storage locations determined in accordance the selected mapping segment object in the memory.

Yet another aspect hereof provides a method operable in a storage controller of a virtualized storage system. The storage system is adapted to manage a virtual volume stored on a portion of each of a plurality of storage devices associated with the storage system. The virtual volume comprises a plurality of 2 terabyte segments. The method comprises receiving a SCSI command block in the storage controller and generating, in the storage controller, a tag value as the SCSI command block is received. The tag value includes a segment identifier identifying a 2 terabyte segment to which the SCSI command block is directed. The method also applies the tag value to a mapping segment selection circuit of the storage controller. The mapping segment selection circuit adapted to select a mapping segment object from a plurality of mapping segment objects stored in a memory of the storage controller. Each mapping segment object is adapted to map logical block addresses of the virtual volume to corresponding physical storage locations. The method then processes the SCSI command block in an I/O processing circuit of the storage controller by accessing physical storage locations determined from logical block addresses identified in the SCSI command block and from the selected mapping segment object.

DETAILED DESCRIPTION OF THE DRAWINGS

Figure 1:
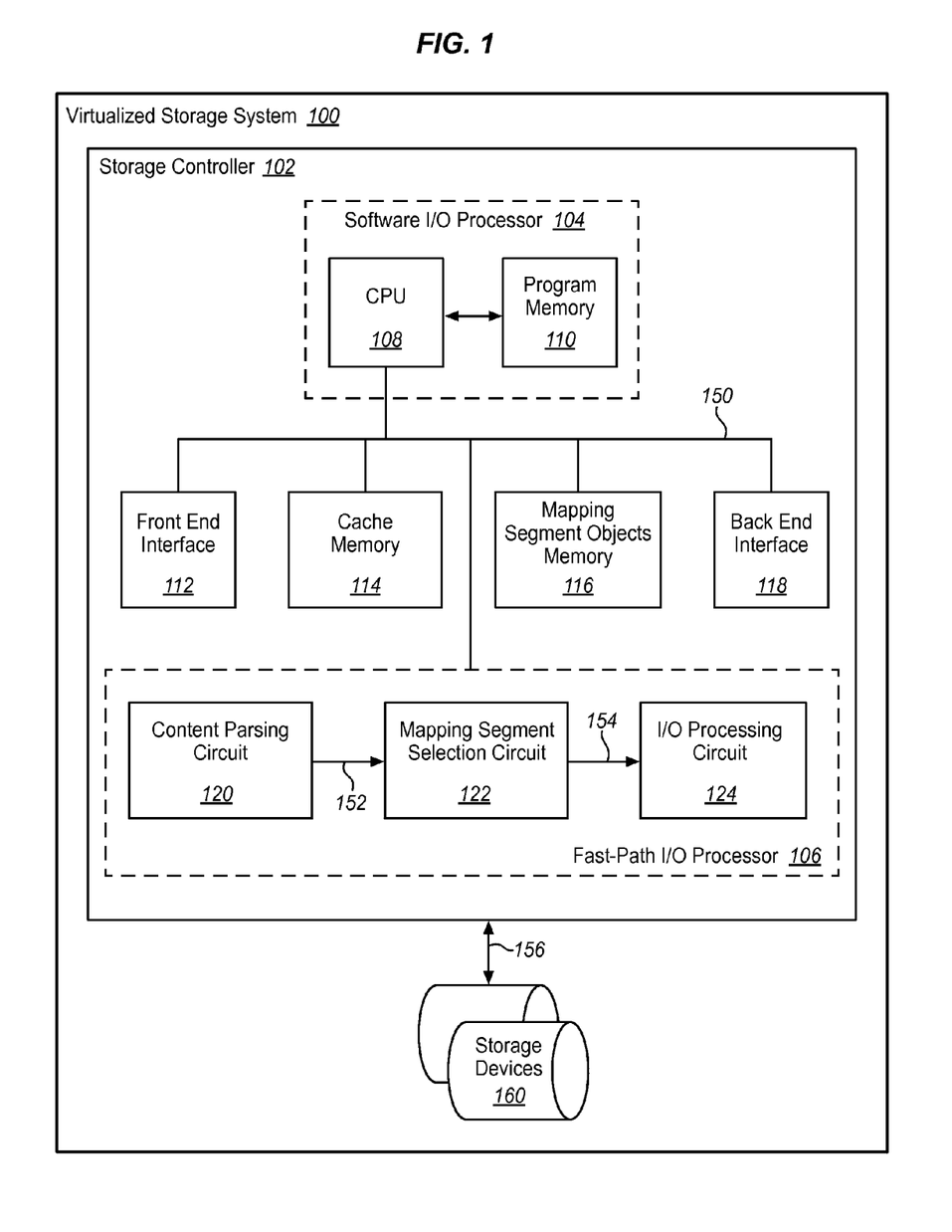
FIG. 1 is a block diagram of an exemplary storage system enhanced in accordance with features and aspects hereof to provide rapid processing of I/O requests directed to large capacity virtual volumes of the storage system.

FIG. 1 is a block diagram of a virtualized storage system 100 enhanced in accordance with features and aspects hereof to provide improved performance in processing of I/O operations directed to large virtual volumes of the system. System 100 includes a storage controller 102 coupled with a plurality of physical storage devices 160 via path 156. Devices 160 may be any storage devices including, for example, magnetic and optical disk drives as well as semiconductor storage devices (e.g., RAM disks and flash drives). Path 156 may be any suitable communication media and utilize an appropriate protocol including, for example, Fibre Channel (FC), Serial Attached SCSI (SAS), Serial Advanced Technology Attachment (SATA), etc. In one exemplary embodiment discussed further herein, storage devices 160 are FC physical target devices and controller 102 couples to the devices using an FC communication medium and protocol for path 156. However, those of ordinary skill in the art will recognize that improved features and aspects hereof may be easily adapted for any desired protocol and communication medium used in or by a storage system.

Virtualized storage systems generally hide all aspects of the physical storage of data from users of the system (i.e., from attached host systems). As storage systems and associated SCSI command protocols have evolved, there has been a natural evolution in storage controller designs from older designs adapted for handling of storage volumes less than 2 terabytes in storage capacity toward newer controller designs adapted to handle virtualized volumes with storage capacities greater than 2 terabytes. Storage controller 102 (more specifically fast-path I/O processor 106 discussed further herein below) is enhanced in accordance with features and aspects hereof to permit improved integration with older storage controller designs that embody design choices that limit virtual volume capacity to 2 terabytes.

Storage controller 102 is exemplary of a so called "split-path" storage controller architecture in which a software I/O processor 104 may process any I/O requests received from attached host systems (not shown) and a "fast-path" I/O processor 106 provides custom circuits adapted for fast processing of common I/O requests (e.g., read and write requests). Software I/O processor 104 may include a general or special purpose processor (CPU) 108 and associated program memory 110 (e.g., ROM, RAM, flash memory, etc.). Suitably programmed instructions are stored in memory 110 and are fetched and executed therefrom by CPU 108 to perform methods for processing of any received I/O request. Though this software I/O processor 104 is generalized to process any received I/O request, it may be too slow for desired performance of the system 100. Thus, fast-path I/O processor 106 is adapted to receive I/O requests in parallel with software I/O processor 104 and is further adapted to perform most (or all) processing of common read and write commands much faster than is possible in the software I/O processor 104.

Software I/O processor 104 and fast-path I/O processor 106 share common circuits including front end interface 112, cache memory 114, segment mapping objects memory 116, and back end interface 118. Front end interface 112 adapts controller 102 for interfacing with attached host systems (i.e., initiator devices—not shown). The coupling may use any suitable communication medium and protocol including, for example, FC, SAS, SATA, etc. In one exemplary embodiment, front end interface 112 couples the controller 102 to SCSI initiators using the FC communication media and protocols—specifically, SCSI-FCP protocols. Back end interface 118 adapts controller 102 for interfacing with attached physical storage devices 160. The coupling may use any suitable communication medium and protocol including, for example, FC, SAS, SATA, etc. In one exemplary embodiment, back end interface 112 couples the controller 102 to FC physical target devices 160 using the FC communication media and protocols—specifically, SCSI-FCP protocols. Cache memory 114, as is well known to those in the art, provides for caching of data read from, and written to, storage devices 160.

Mapping segment objects memory 116 is a memory device (e.g., RAM, flash, etc.) adapted to store objects used by software I/O processor 104 and by fast-path I/O processor 106 to map virtual addresses of virtual volumes to physical storage locations. A virtual volume comprises a contiguous range of logical addresses (logical block addresses). Each logical address is mapped to a corresponding physical storage location—i.e., a physical storage location on an identified physical storage device. The objects stored in memory 116 are used by storage controller 102 to map or translate logical addresses supplied in an I/O request into corresponding physical storage locations on the physical storage devices 160. In accordance with features and aspects hereof, the objects in memory 116 allow fast-path I/O processor 106 to rapidly select appropriate mapping objects in memory 116 to enable it to process logical addresses for a received I/O request with little or no latency as the I/O request is received. More specifically, as discussed in detail herein below, the mapping segment objects in memory 116 allow fast-path I/O processor 106 to rapidly identify mapping objects that relate to a particular segment of the total storage capacity of a virtual volume stored on physical storage devices 160. Still more specifically, in one exemplary embodiment, each mapping segment object identifies a map used to translate logical addresses in a corresponding 2 terabyte segment of an identified virtual volume's capacity into corresponding physical storage locations on physical storage devices 160. By segmenting the virtual volume storage capacity of larger virtual volumes into 2 terabyte segments, the enhanced features of the fast-path I/O processor 106 may be more easily integrated into legacy storage controller designs that were originally limited to 2 terabyte maximum volume capacity.

Fast-path I/O processor 106 includes content parsing circuit 120 adapted to parse a SCSI command descriptor block (CDB) as it is received from an attached host system (e.g., a SCSI CDB received embedded within an FCP_CMND FC frame received via path 150 through front end interface 112). Content parsing circuit 120 generates a tag value based on information in the received SCSI CDB. The tag value so generated is applied via path 152 as an input to mapping segment selection circuit 122 of fast-path I/O processor 106. Circuit 122 then selects an appropriate mapping segment object from memory 116 based on the tag value applied as its input. Mapping segment selection circuit 122 generates a segment selection signal indicating the selected mapping segment object associated with the tag value. The generated segment selection signal is then applied via path 154 as an input to I/O processing circuit 124. I/O processing circuit 124 comprises logic circuits adapted to process common read and write SCSI CDBs with little or no intervention by the slower processing of software I/O processor 104. Circuit 124 retrieves mapping information from memory 116 to enable its processing to map logical addresses referenced by the SCSI CDB into corresponding physical storage locations on the physical storage devices 160.

Exemplary functions performed by circuits 120 and 122 of fast-path I/O processor 106 are further detailed herein below. Particular logic circuit designs to implement these functions will be readily apparent to those of ordinary skill in the art. Further, the exemplary modular decomposition of the functions of fast-path I/O processor 106 represents only one possible design choice. Those of ordinary skill in the art will readily recognize a variety of modular decompositions of logic functions performed by fast-path I/O processor 106 integrating its various functions into tightly coupled logic circuits or separating various functions into logic modules with well defined interface signals and signal paths coupling the various logic modules. Still further, those of ordinary skill in the art will readily recognize numerous additional and equivalent elements that may be present in a fully functions storage controller 102 and system 100. Such additional and equivalent elements are omitted from FIG. 1 for simplicity and brevity of this discussion.

Figure 2:
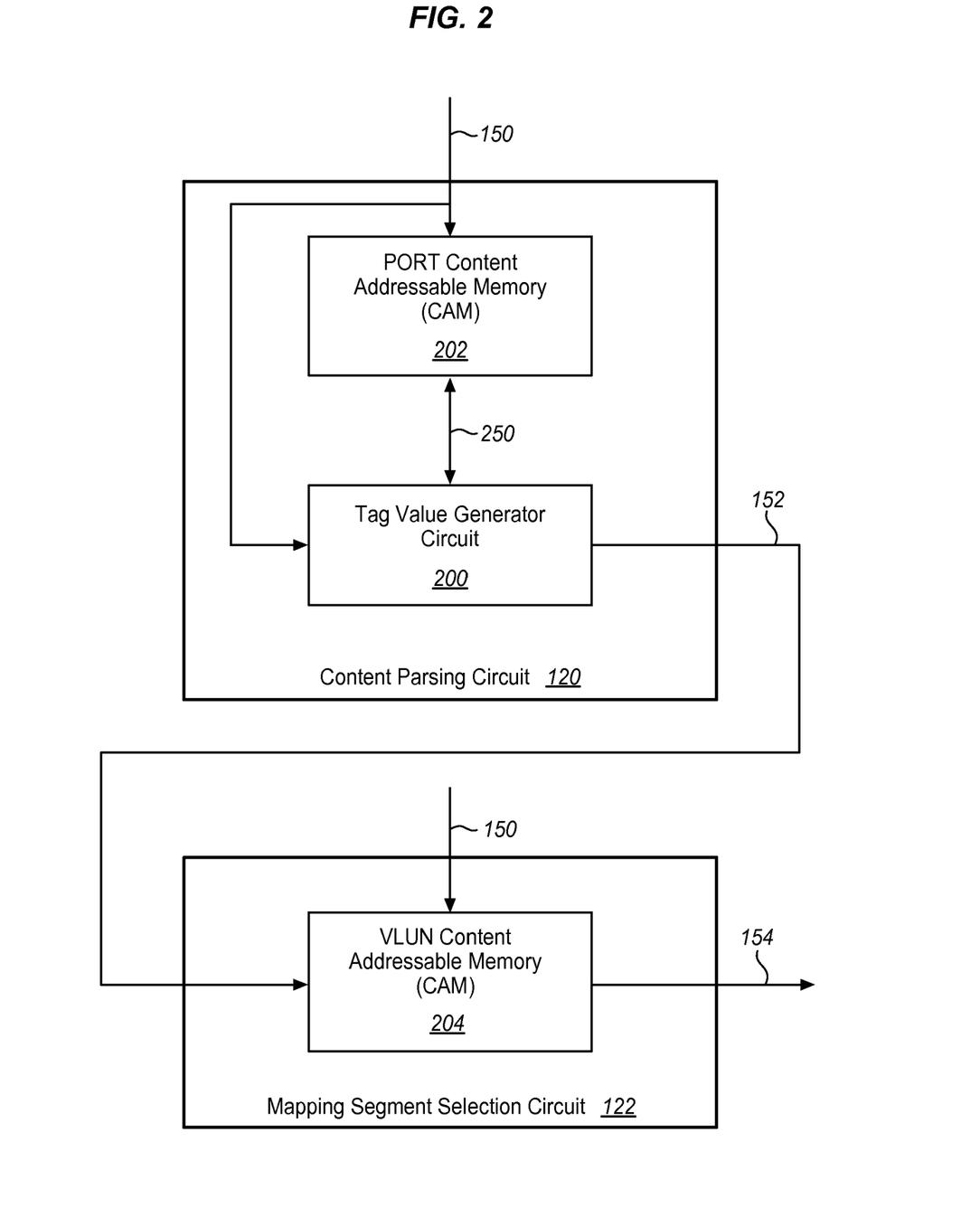
FIG. 2 is a block diagram providing exemplary additional details of an embodiment of a content parsing circuit and a mapping segment selection circuit of the enhanced storage controller of the system of FIG. 1.

As generally discussed above with reference to FIG. 1, content parsing circuit 120 of fast-path I/O processing I/O processor 106 may generate a tag value used by mapping segment selection circuit 122 to select an appropriate mapping segment object from the mapping segment objects memory 116. In one exemplary embodiment, a content addressable memory (CAM) circuit may be utilized in the generation of the tag value and/or in selection of an appropriate mapping segment object. FIG. 2 is a block diagram providing exemplary additional details of such an exemplary embodiment utilizing content addressable memory for both the tag value generation and for the mapping segment object selection. Content parsing circuit 120 may include a tag value generator circuit 200 coupled through path 150 to receive the SCSI CDB (e.g., a CDB embedded within an FCP_CMND in the context of an FC connection to a host system). As the CDB is received, content parsing circuit 120 analyzes information in the received CDB to generate a tag value applied to path 152 as an input to mapping segment selection circuit 122. As noted above, the tag value may include information identifying the particular source and destination indicated in the received CDB. The source (initiator) and destination (target) are sometimes referred to as an I/T nexus. Further, in the context of an FC communication media and protocols, a port identifier may also be utilized to completely identify the particular source and destination of the received CDB. To reduce the size of these identification components, they may be used in combination as a key to locate a corresponding value that more concisely uniquely identifies the I/T nexus.

Tag value generator circuit 200 extracts the source, destination, and port information from the received FCP_CMND, concatenates the extracted information, and applies the concatenated value, via path 250, as an input to a content addressable memory 202. CAM 202 uses the applied input value to locate a corresponding I/T key value that concisely and uniquely identifies the requestor for the FCP_CMND (i.e., identifies the I/T nexus). CAM 202 applies the located I/T key value to path 250 for further processing within circuit 200. Thus, content addressable memory 202 may be used by circuit 200 within content parsing circuit 122 to generate an I/T key value as a portion of the ultimate tag value applied to be applied to path 152. Tag value generator circuit 200 may then combine this I/T nexus identification portion of the tag value with other information extracted from the CDB embedded in the received FCP_CMND to fully identify a particular segment of a particular identified virtual volume. For example, the logical unit identifier (LUN) may be extracted from the CDB and concatenated with the I/T key value to more fully identify the particular virtual volume to be accessed by the CDB. Still further, tag value generator circuit 200 may extract logical addressing information from the received CDB and concatenate the extracted portions with the LUN and I/T key value to completely form the tag value. The extracted portions of the logical addressing information may be those that identify a particular segment of the identified virtual volume for the identified IP nexus.

Concatenating these various portions generates a complete tag value uniquely identifying a particular segment of an identified virtual volume. The tag value so generated is applied to an output of content parsing circuit 120 via path 152 as input to mapping segment selection circuit 122. Mapping segment selection circuit 122 may also include a CAM 204 used to lookup the tag value applied as input via path 152 to find a corresponding mapping segment object identifier. The mapping segment object identifier so located utilizing CAM 204 is then applied as an output of mapping segment selection circuit 122 via path 154. The mapping segment object identifier is then utilized by the I/O processing circuit of the fast-path I/O processor to perform logical to physical storage location mapping for further processing of the received CDB. Exemplary contents of CAMs 202 and 204 are discussed further herein below.

Figure 3:
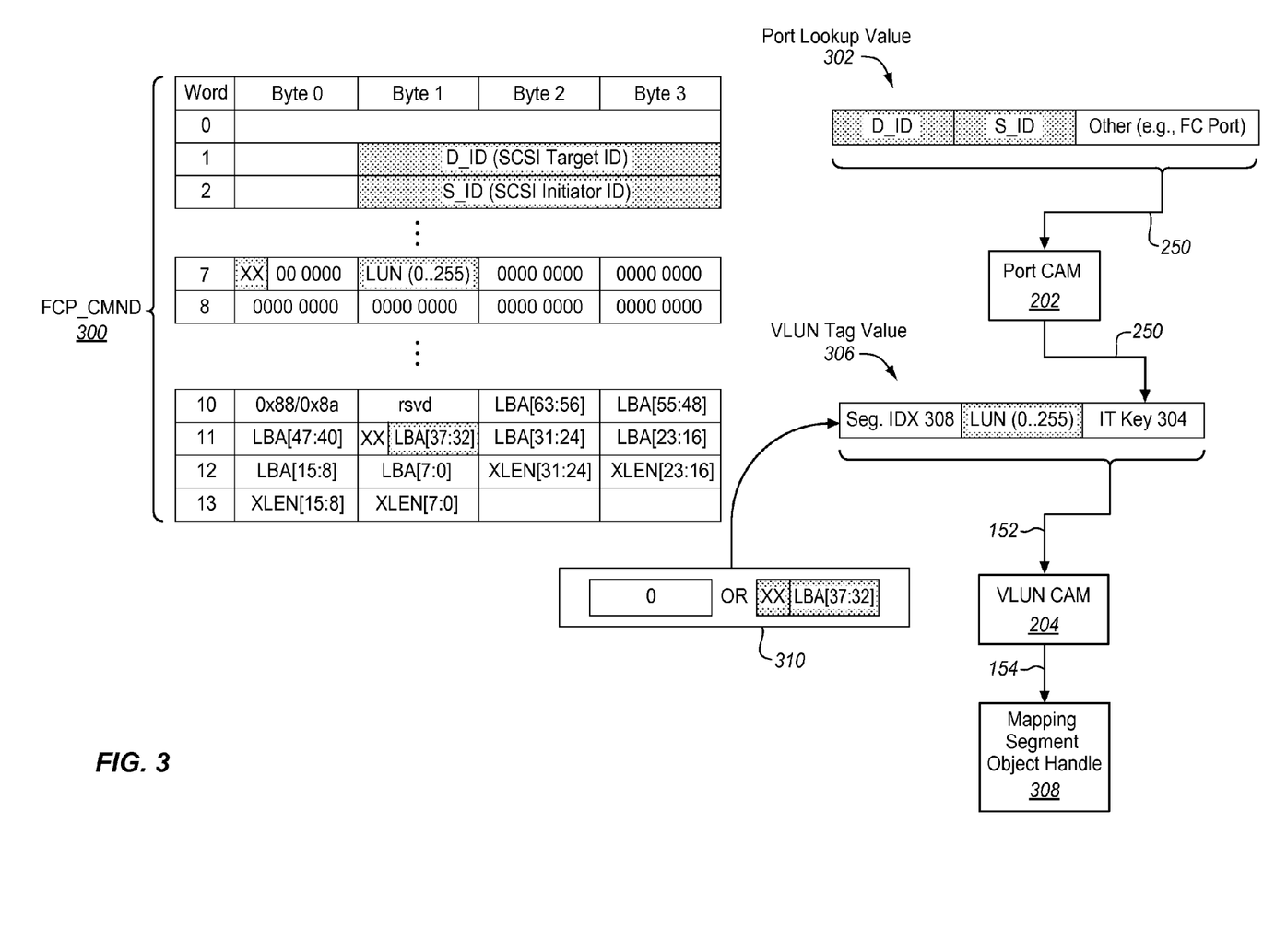
FIG. 3 is a diagram of an exemplary FCP_CMND with an embedded SCSI CDB and processing of that CDB to select a mapping segment object by operation of the systems of FIGS. 1 and 2.

FIG. 3 is a block diagram showing elements of an exemplary FCP_CMND 300 as may be received and parsed by content parsing circuit 120 for generating portions of the tag value to be applied to mapping segment selection circuit 122. For example, the destination device identifier (D_ID) identifying a SCSI target device may be extracted from word 1 of the FCP_CMND 300. In like manner, the source device identifier (S_ID) identifying the requesting SCSI initiator device may be extracted from word 2 of the FCP_CMND 300. The D_ID and S_ID and other information (such as the FC Port identifier extracted from other aspects of the FC frame) may be concatenated to form a port lookup value 302. The port lookup value 302 may be applied as discussed above to port cam 202 via path 250 as described in FIG. 2. The output of port cam 202 is an IT key value 304 that may, in turn, form a portion of a tag value 306. The IT key 304 thus identifies the particular IP nexus associated with the CDB embedded in the received FCP_CMND 300.

As noted above, the content parsing circuit 120 then concatenates other information extracted from the received CDB with the IT key 304 to generate a complete tag value 306. In particular, the logical unit number (LUN) may be extracted from word 7 of the FCP_CMND 300 and added to the tag value 306 to identify the virtual volume to be accessed by the received CDB. In like manner, an appropriate portion of the logical block address information provided in the FCP_CMND 300 may be extracted and concatenated into the tag value 306 to identify the particular segment of the identified virtual volume to be accessed.

In one exemplary embodiment, each segment of a virtual volume has a maximum capacity of 2 terabytes (i.e., a typical inherent design limitation of older, legacy storage controllers that processed 10 byte SCSI CDBs). Where the FCP_CMND 300 includes embodies only a 10 byte SCSI CDB, the entire virtual volume comprises at most only a single 2 terabyte segment (due to the maximum addressing range of a 10 byte SCSI CDB). Tag value generator circuit 200 senses the presence of a 10 byte SCSI CDB in the received FCP_CMND 300 and encodes the segment index value 308 of the tag value as a zero indicating the first and only 2 terabyte segment of the virtual volume is identified by the CDB in the received FCP_CMND 300. When tag value generator circuit 200 senses the presence of a SCSI CDB larger than 10 bytes (e.g., a 16 byte SCSI CDB or a 32 byte SCSI CD be), high order address bits (e.g., logical block address bits 32 through 37) are extracted from the larger SCSI CDB in the FCP_CMND 300 and concatenated into the tag value 306 as the segment index value 308. This logic performed by tag value generator circuit 200 is represented as block 310 indicating either a zero value or logical address bits extracted from the CDB as being concatenated into the tag value 306.

The bits marked "XX" in FIG. 3 designate an addressing mode used by the CDB in accordance with SCSI standards. Bit values of 00 indicate the peripheral addressing mode, 01 indicates the logical device addressing mode, and 10 indicates the logical addressing mode. The addressing mode bits may control interpretation of the logical address provided in the CDB and thus may impact the bits and bytes extracted to form the segment index 310 to be used in the mapping process. Those of ordinary skill in the art are familiar with the interpretation of these addressing modes and any alterations to the extraction of address bits and bytes to identify the 2 terabyte segment being addressed by the CDB.

Having so constructed the tag value 306, the content parsing circuit 120 applies the generated tag value 306 via path 152 as an input to the mapping segment selection circuit 122. In particular, the tag value 306 may be applied to a content addressable memory 204 within the mapping segment selection circuit 122. Content addressable memory 204 locates an entry corresponding to the applied tag value 306 and generates an output value indicating the selected mapping segment object associated with the applied tag value. The output value may be, for example, a mapping segment object handle 308 uniquely identifying a particular corresponding mapping segment object stored in memory 116 of the enhanced storage controller. As previously discussed, the mapping segment object handle 308 so generated is applied via path 154 to the I/O processing circuit of the fast-path I/O processor of the storage controller. The fast-path I/O processor of the storage controller may then complete processing of the received FCP_CMND 300 and, more specifically, may complete the underlying SCSI command embedded within the received FCP_CMND 300.

Those of ordinary skill in the art will readily recognize numerous values and formats that may be utilized for the tag value 306 and/or the port lookup value 302. The particular values described in FIG. 3 are therefore intended merely as exemplary of one possible embodiment of features and aspects hereof. More generally, the content parsing circuit 120 and mapping segment selection circuit 122 of the FIGS. 1 and 2 are operable to uniquely identify a particular segment of an identified virtual volume managed by an identified I/T nexus. The particular segment is identified as the FCP_CMND 300 is received thereby reducing overhead latency associated with prior designs. Further, the enhanced fast-path I/O processor utilizing the mapping segmentation described herein may be more readily integrated with older legacy storage controller designs wherein a maximum segment size may be inherent in prior designs of the storage controller.

Figure 4:
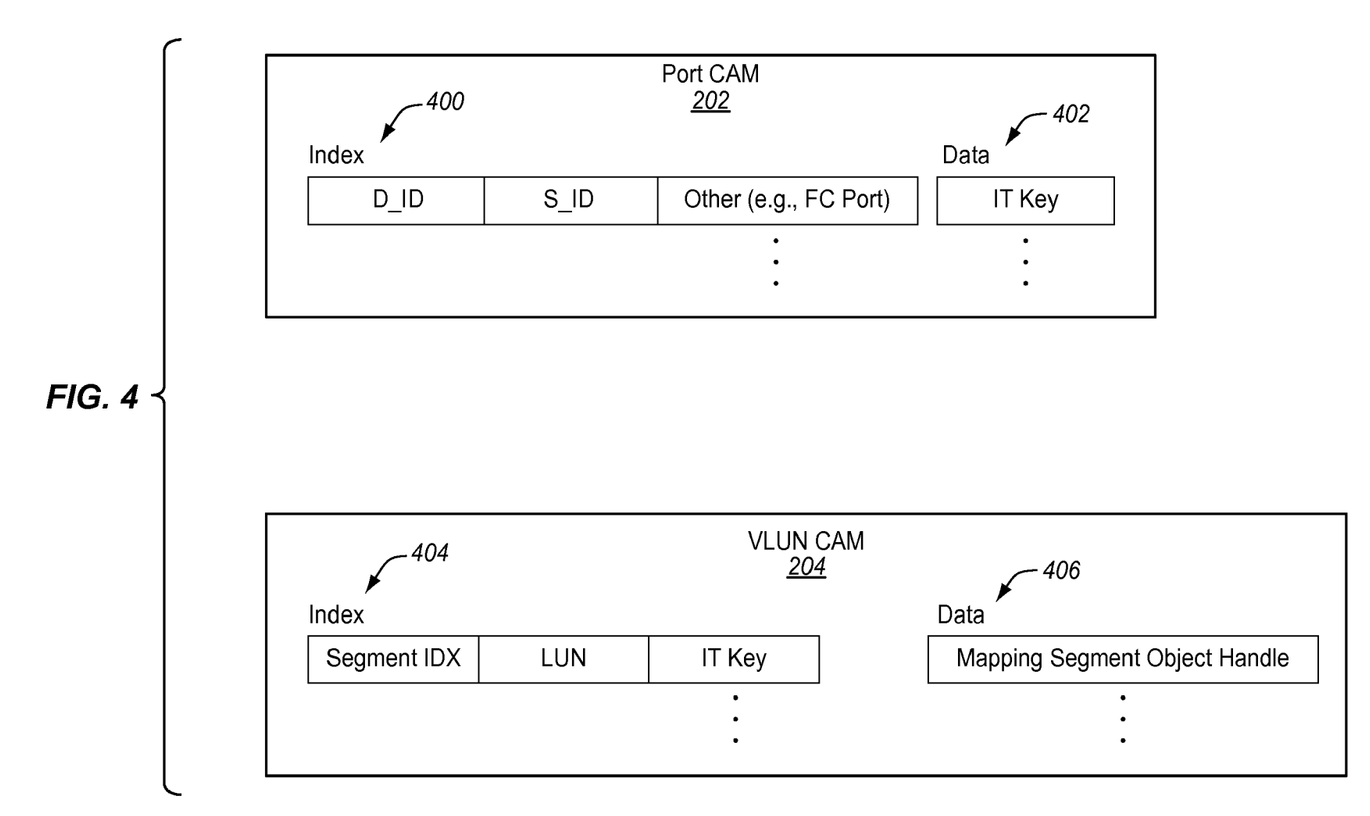
FIG. 4 is a diagram of exemplary content of content addressable memories as may be used in the systems of FIGS. 1 and 2.

FIG. 4 is a block diagram describing exemplary contents of CAMs 202 and 204 used for generating the mapping segment object handle. CAM 202 may contain a plurality of entries each entry comprising an index value 400 and an associated data value 402. The index value 400 is used as a key value to locate corresponding data value 402. As described above, an index value 400 may comprise a destination identifier (D_ID), a source identifier (S_ID), and any other associated identifier information such as an FC port number. The associated data value 402 for each entry comprises a smaller key value (IT key) that may be used in generating a portion of the tag value. CAM 204 may include a plurality of entries, each entry including an index value 404 and an associated data value 406. The index value 404 of each entry may comprise a segment index value (Segment IDX), a logical unit or volume identifier value (LUN), and an IT key value identifying the particular I/T nexus generating the SCSI request. The corresponding data value 406 comprises a segment mapping object handle. The handle may be any form of object identifier including, for example, a simple pointer to the location of the corresponding mapping object in a memory or any other suitable object identifier.

Those of ordinary skill in the art will readily recognize that the content of any such content addressable memories utilized in tag value generation and/or mapping segment selection may be programmed as an administrative task when the storage system is initialized. For example, an administrative user may define the contents of the CAMs (202 and 204) as an aspect of installation of the storage system and/or as an aspect of defining a new virtual volume managed by the storage system. Further, the storage controller of the storage system may automatically update the content of the various CAMs in response to an administrative user defining a new virtual volume or otherwise initializing the storage system.

Figure 5:
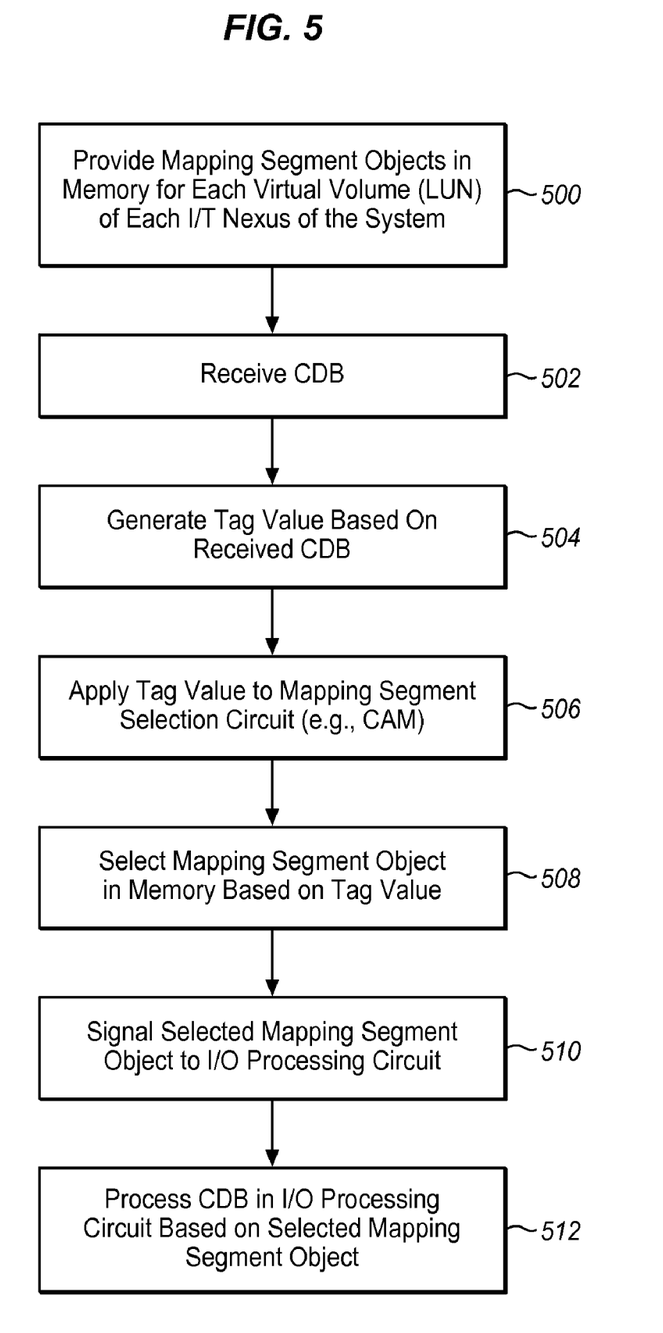
FIGS. 5 and 6 are flowcharts describing exemplary methods in accordance with features and aspects hereof to provide rapid processing of I/O requests directed to large capacity virtual volumes of the storage system.

FIG. 5 is a flowchart describing an exemplary method operable in a virtualized storage system enhanced in accordance with features and aspects hereof to improve I/O request processing within a fast-path I/O processor of a storage controller. The method of FIG. 5 may be operable in a storage controller such as controller 102 of FIG. 1 and, more specifically, may be operable within a fast-path I/O processor such as processor 106 of storage controller 102 in FIG. 1. At step 500 an administrative user of the storage system or administrative process within the storage system initially provides mapping information in a memory of the storage system for each virtual volume of each I/T nexus managed by the system. In particular, the mapping information includes mapping segment objects providing mapping of logical addresses of a virtual volume to corresponding physical storage locations on physical storage devices of the storage system. Each object provides such mapping information for a corresponding segment of a corresponding virtual volume. In one exemplary embodiment, each segment comprises 2 terabytes of storage capacity of the total storage capacity of the corresponding virtual volume. Thus, each mapping segment object provides logical to physical mapping information for logical block addresses within the corresponding 2 terabyte segment of the virtual volume.

As noted above, the mapping segment objects may be initially defined when a new virtual volume is created and are generally maintained and updated by the storage system as a virtual volume is accessed and modified. Further, as noted above, any content addressable memories utilized by the enhanced features and aspects hereof may be initially programmed when a new virtual volume is defined or the system is otherwise initialized and may be maintained and updated by the storage system as a virtual volume is accessed and modified. At step 502, the storage controller of the storage system begins receiving a CDB from an attached initiator (e.g., receipt of a FCP_CMND from an attached host system).

Substantially concurrent with receipt of the CDB, step 504 generates a tag value based on information in the received CDB. As described above, the tag value may identify a particular segment of a particular identified virtual volume managed by a particular identified I/T nexus. At step 506, the generated tag value is applied to a mapping segment selection circuit of the storage controller. As noted above in one exemplary embodiment, the mapping segment selection circuit may comprise a content addressable memory used for translating the applied tag value into a corresponding mapping segment object handle/identifier. In other embodiments, any suitable lookup table mechanism may be utilized by the mapping segment selection circuit to associate the applied tag value with a corresponding mapping segment object. At step 508, the mapping segment selection circuit selects an appropriate mapping segment object in the memory of the storage controller based on the applied tag value utilizing the CAM or other lookup table structure. At step 510, the mapping segment selection circuit applies of signal identifying the selected mapping segment object to an I/O processing circuit of the storage controller (e.g., an I/O processing circuit within the fast-path I/O processor of the storage controller). At step 512, the I/O processing circuit processes the CDB in the received FCP_CMND in accordance with mapping information identified by the selected mapping segment object. Thus, the method of FIG. 5 selects and utilizes an appropriate mapping segment object within the I/O processing circuit without imposing overhead latency by parsing the CDB in the FCP_CMND as it is received from an attached initiator. This reduction of overhead latency permit faster processing of common I/O requests (e.g., read and write requests) within the fast-path I/O processor of the storage controller even for virtual volumes larger than the inherent size limitation of any particular segment.

Figure 6:
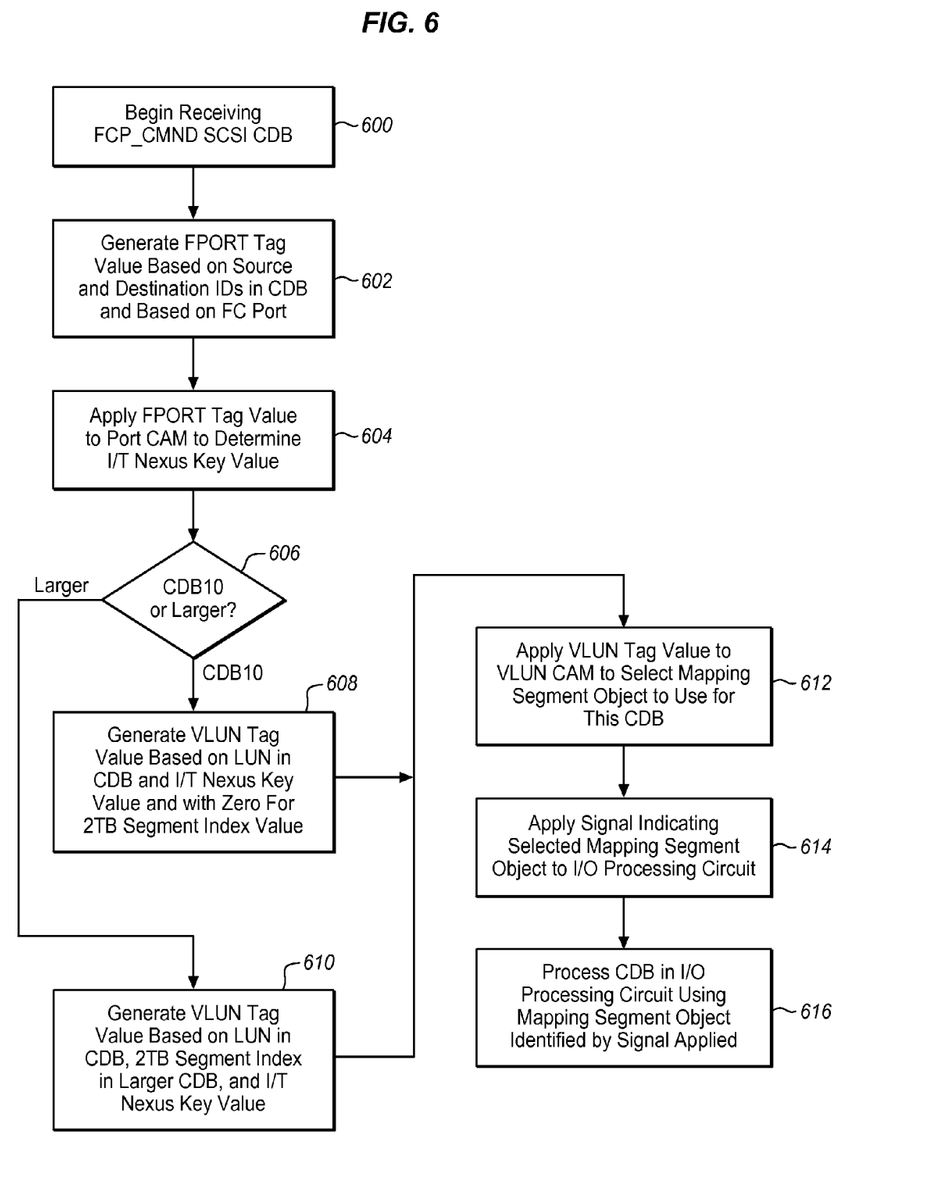

FIG. 6 is a flowchart describing another exemplary method operable in an enhanced storage system in accordance with features and aspects hereof. The method of FIG. 6 is operable in the storage controller of an enhanced storage system such as controller 102 of FIGS. 1 and 2 and more specifically is operable within an enhanced fast-path I/O processor of the storage controller. The method of FIG. 6 is particularly applicable in storage systems incorporating inherent design choices of the storage controller that limit the size of any particular segment to 2 terabytes (e.g., 32 bit logical block addresses). Mapping information for virtual volumes exceeding the 2 terabyte capacity limitation is divided into segments corresponding to each of a plurality of 2 terabyte segments of the total capacity of the larger virtual volume.

At step 600, the fast-path I/O processor of the storage controller begins receiving an FCP_CMND frame containing an embedded SCSI CDB. As the FCP_CMND is received, a content parsing circuit within the fast-path I/O processor extracts information used to identify a particular segment of an identified virtual volume to be accessed by an identified IT nexus. As initial portions of the CDB are received, step 602 generates an FPORT tag value based on source and destination identification information in the CDB and, in the context of an FC coupling to the initiator, extracts further identification information based on the FC port number. Step 604 applies the generated FPORT tag value to a port CAM to determine a corresponding I/T nexus key value. The I/T nexus key value represents the source, destination, and port information in a concise form to be applied as an input to the port CAM. In other embodiments, any suitable indicia of the I/T nexus may be incorporated in a key used to later select an appropriate mapping object for use in processing the received CDB. The output signal generated by the port CAM is the I/T nexus key value that may be used as a portion of a VLUN tag value to be generated for selection of a mapping object.

As receipt of the CDB continues, step 606 determines whether the received CDB is a 10 byte SCSI CDB or a larger SCSI CDB (e.g., a 16 byte or larger SCSI CDB). If the received CDB is a 10 byte CDB, step 608 generates a VLUN tag value based on the virtual volume identifier (LUN) in the CDB and based on the I/T nexus key value generated by the port CAM in step 604. Since a 10 byte CDB is limited to addressing 2 terabytes maximum capacity of a virtual volume, a zero value is added to the VLUN tag value to indicate that the first and only 2 terabyte segment of the identified virtual volume is referenced by the received CDB. Having so generated a VLUN tag value, processing continues at step 612 as discussed below. When step 606 determines that the CDB being received is larger than 10 bytes (e.g., 16 or more bytes), step 610 generates a VLUN tag value based on the LUN, the I/T nexus value, and a segment identifier extracted from logical addressing information in the received CDB. Since a larger CDB is not limited to virtual volumes having a maximum capacity of 2 terabytes, a segment identifier (i.e., segment index value) is added to the VLUN tag value to indicate which of a plurality of 2 terabyte segments of the total virtual volume capacity is addressed by the received CDB. Those of ordinary skill in the art will readily recognize that if a single CDB (e.g., a single I/O request) spans multiple 2 terabyte segments that the software I/O processor may provide any required special processing for such a request.

Step 612 applies the generated VLUN tag value to a VLUN CAM within a mapping segment selection circuit of the fast-path I/O processor in the storage controller. The output of the VLUN CAM is an identifier of the mapping segment object in the mapping segment objects memory of the controller to be used for mapping logical addresses to physical storage locations in processing the I/O request represented by the received CDB. The mapping selection segment selection circuit uses the output of the CAM to generate a signal for application to an I/O processing circuit of the fast-path I/O processor and applies the generated signal to the I/O processing circuit at step 614. Step 616 then represents processing of the I/O request represented by the received CDB by the I/O processing circuit of the fast-path I/O processor. The processing utilizes the identified mapping segment object to map logical addresses in the underlying command of the received CDB into corresponding physical storage locations.

Those of ordinary skill in the art will readily recognize numerous additional and equivalent steps in the methods of FIGS. 5 and 6. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. Apparatus within a storage controller of a virtualized storage system for logical to physical mapping of virtual volumes, the apparatus comprising:
   a memory adapted to store one or more mapping segment objects each mapping segment object adapted to map logical block addresses of a corresponding virtual volume to corresponding physical storage locations;
   a content parsing circuit having an input signal path coupled with an attached initiator and having an output signal path, the content parsing circuit adapted to parse a SCSI command block as the SCSI command block is received from the initiator, wherein the content parsing circuit generates a tag value applied to its output signal path, the tag value generated based on information in the received SCSI command block;
   a mapping segment selection circuit having an input signal path coupled with the output signal path of the content parsing circuit to receive a tag value and having an output signal path, the mapping segment selection circuit adapted to select a mapping segment object in the memory based on a received tag value, the mapping segment selection circuit further adapted to apply a signal to its output signal path indicating the selected mapping segment object; and
   an I/O processing circuit coupled with the memory and having an input signal path coupled with the mapping segment selection circuit, the I/O processing circuit adapted to access the selected mapping segment object in the memory and adapted to process a received SCSI command block by accessing physical storage locations determined in accordance the selected mapping segment object.

2. The apparatus of claim 1
   wherein the tag value comprises a virtual volume identifier and comprising a segment identifier identifying a segment of the identified virtual volume to which the SCSI command block is directed.

3. The apparatus of claim 2
   wherein the content parsing circuit is further adapted to parse both 10 byte SCSI command blocks and SCSI command blocks larger than 10 bytes,
   wherein the segment identifier is a fixed predetermined value when the content parsing circuit parses a 10 byte SCSI command block, and
   wherein the segment identifier is a value identifying which of multiple segments of the identified virtual volume the SCSI command block is directed to when the content parsing circuit parses SCSI command block larger than 10 bytes.

4. The apparatus of claim 3
   wherein the fixed predetermined value is zero, and
   wherein the segment identifier is a value indicating which of multiple 2 terabyte segments to which the SCSI command block is directed when the content parsing circuit parses a SCSI command block larger than 10 bytes.

5. The apparatus of claim 1
   wherein the mapping segment selection circuit further comprises:
   a content addressable memory (CAM) circuit having a plurality of entries, each entry adapted to associate a tag value with a segment handle value indicating a corresponding selected mapping segment object, the CAM adapted to locate a corresponding segment handle value in response to receipt of a tag value and further adapted to apply the located segment handle value to the output signal path of the mapping segment selection circuit.

6. The apparatus of claim 5
   wherein the I/O processing circuit is further adapted to access the selected mapping segment object based on the segment handle value received as an input from the mapping segment selection circuit.

7. The apparatus of claim 1
wherein the one or more mapping segment objects in the memory are arranged as contiguous objects having the same predetermined size,
wherein the signal applied to the output path of the mapping segment selection circuit comprises a segment index into the array of mapping segment objects, and
wherein the I/O processing circuit is further adapted to access the selected mapping segment object based on the segment index received as an input from the mapping segment selection circuit.

8. A method operable in a storage controller of a virtualized storage system, the virtualized storage system adapted to manage one or more virtual volumes, each virtual volume defined within the storage system to comprise physical storage locations of each of one or more physical storage devices coupled with the storage system, the storage controller adapted to process a SCSI command block to access an identified virtual volume, the method comprising:
providing one or more mapping segment objects stored in a memory within the storage controller each mapping segment object adapted to map logical block addresses of a corresponding virtual volume to corresponding physical storage locations;
receiving, in a parsing circuit within the storage controller, a SCSI command block identifying a virtual volume and identifying a segment of the virtual volume to be accessed by the SCSI command block;
generating, in the parsing circuit, a tag value based on information in the received SCSI command block;
applying the tag value from the parsing circuit to a mapping segment selection circuit within the storage controller;
selecting, in the mapping segment selection circuit, a mapping segment object in the memory based on the applied tag value;
applying a signal from the mapping segment selection circuit to an I/O processing circuit in the storage controller, the signal indicating the selected mapping segment object; and
processing the received SCSI command block in the I/O processing circuit by accessing physical storage locations determined in accordance the selected mapping segment object in the memory.

9. The method of claim 8
wherein the step of generating the tag value comprises:
generating the tag value comprising a virtual volume identifier and comprising a segment identifier identifying a segment of the identified virtual volume to which the SCSI command block is directed.

10. The method of claim 9
wherein the content parsing circuit is further adapted to parse both 10 byte SCSI command blocks and SCSI command blocks larger than 10 bytes,
wherein step of generating the tag value comprises:
generating the tag value comprising a fixed predetermined value for the segment identifier when the received SCSI command block is a 10 byte SCSI command block; and
generating the tag value comprising a value for the segment identifier identifying which of multiple segments of the identified virtual volume the SCSI command block is directed to when the SCSI command block is larger than 10 bytes.

11. The method of claim 10
wherein the fixed predetermined value is zero, and
wherein the segment identifier value indicates which of multiple 2 terabyte segments to which the SCSI command block is directed when the SCSI command block is larger than 10 bytes.

12. The method of claim 8
wherein the segment selection circuit comprises a content addressable memory (CAM) circuit having a plurality of entries, each entry adapted to associate a tag value with a segment handle value indicating a corresponding selected mapping segment object, and
wherein the step of selecting further comprises:
receiving the tag value as an input to the CAM; and
generating the signal as a segment handle value indicating the selected mapping segment object as an output of the CAM resulting from the tag value applied as an input to the CAM.

13. The method of claim 12
wherein the step of processing further comprises:
accessing the selected mapping segment object in the memory based on the segment handle value received as an input from the CAM.

14. A method operable in a storage controller of a virtualized storage system, the storage system adapted to manage a virtual volume stored on a portion of each of a plurality of storage devices associated with the storage system, the virtual volume comprising a plurality of 2 terabyte segments, the method comprising: receiving a SCSI command block in the storage controller; generating, in the storage controller, a tag value as the SCSI command block is received, the tag value including a segment identifier identifying a 2 terabyte segment to which the SCSI command block is directed; applying the tag value to a mapping segment selection circuit of the storage controller, the mapping segment selection circuit adapted to select a mapping segment object from a plurality of mapping segment objects stored in a memory of the storage controller, each mapping segment object adapted to map logical block addresses of the virtual volume to corresponding physical storage locations; processing the SCSI command block in an I/O processing circuit of the storage controller by accessing physical storage locations determined from logical block addresses identified in the SCSI command block and from the selected mapping segment object, wherein the tag value comprises a virtual volume identifier and a segment identifier identifying a segment of the virtual volume to which the SCSI command block is directed, wherein step of generating the tag value comprises: generating the tag value comprising a zero value for the segment identifier when the received SCSI command block is a 10 byte SCSI command block; and generating the tag value comprising a segment index value for the segment identifier identifying which of multiple segments of the virtual volume the SCSI command block is directed to when the SCSI command block is larger than 10 bytes.

* * * * *